United States Patent [19]

Jacquelin

[11] 4,233,115
[45] Nov. 11, 1980

[54] SAFETY APPARATUS FOR A NUCLEAR REACTOR

[75] Inventor: Roland Jacquelin, Manosque, France

[73] Assignee: Commissariat a l'Energie Atomique, Paris, France

[21] Appl. No.: 894,002

[22] Filed: Apr. 6, 1978

[30] Foreign Application Priority Data

Apr. 15, 1977 [FR] France .................... 77 11418

[51] Int. Cl.² ............................................. G21C 7/08
[52] U.S. Cl. ........................... 176/36 C; 176/DIG. 5
[58] Field of Search ............ 176/36 C, 36 R, DIG. 5, 176/86 R

[56] References Cited

U.S. PATENT DOCUMENTS

| | | | |
|---|---|---|---|
| 3,546,996 | 12/1970 | Grijalva | 176/DIG. 5 |
| 3,976,540 | 8/1976 | Sowa | 176/DIG. 5 |
| 3,976,543 | 8/1976 | Sowa | 176/DIG. 5 |
| 4,019,954 | 4/1977 | Giordano et al. | 176/36 C |

FOREIGN PATENT DOCUMENTS 965014 7/1964 United Kingdom .................. 176/36 C

OTHER PUBLICATIONS

UAC-29384, ANL/CT-76-2 (8/75) Josephson et al. Final Report Development of Self-actuated Shutdown Systems for LMFbR Plants pp. 1–11, 181.

Primary Examiner—Samuel W. Engle
Assistant Examiner—S. A. Cangialosi
Attorney, Agent, or Firm—Kerkam, Stowell, Kondracki & Clarke

[57] ABSTRACT

Safety apparatus for a nuclear reactor comprising an absorbing element having a supporting head connected by a disconnectable linkage constituted by the armature of an electromagnet to the end of an axially movable vertical operating rod, said linkage being such that in the case of a disconnection the absorbing element slides by gravity in a passage bounded by an open container through the core of the reactor, wherein the operating rod is associated with a metal member having an expansion coefficient which is significantly higher than that of the armature of the electromagnet, whereby in the case of a temperature rise a separating force is exerted between the head of the absorbing element and the operating rod.

3 Claims, 3 Drawing Figures

SAFETY APPARATUS FOR A NUCLEAR REACTOR

BACKGROUND OF THE INVENTION

The present invention relates to a safety apparatus for a nuclear reactor, particularly a fast neutron reactor whose core, cooled by the circulation of a liquid metal, in general sodium, has a central area called the fuel area and a peripheral covering area surrounding the said central area.

The control of the safety of a nuclear reactor of this type and in particular the immediate stoppage of the nuclear reaction in the case of incidents or accidents of various types which may possibly occur during operation necessitates the use of reliable effective means which in conventional manner comprise neutron-absorbing elements which can be introduced into the core and in particular into the fuel area within a very short time, whereby a sufficient number of said absorbing elements distributed throughout the core are provided to very rapidly stop the reaction.

In the U.S. patent application Ser. No. 521,900 filed on Nov. 7, 1974. already describes an apparatus of this type which comprises an absorbing system equipped with a support head connected by a disconnectable linkage to the lower end of an axially movable vertical operating rod, whereby after the disconnection of the disconnectable linkage said absorbing system is able to slide by gravity from an upper position into a lower position in a passage which is defined through the reactor core by a container which is open at its upper end and is arranged. in the core among other containers containing the nuclear fuel. In this apparatus the disconnectable linkage between the head of the absorbing element and the end of the operating rod is arranged, with the element in the upper position, in the upper part and at least partly within the open container, the absorbing element extending into said container in the core covering area outside the central area.

Preferably the disconnectable linkage is realised by means of an electromagnet armature fitted at the lower end of the operating rod. The absorbing element is constructed in articulated form by means of absorbing links joined to one another beneath the head of the element and cooperating in the lower engagement position in the core with an internal abutment of the container, whereby a shock absorber system is preferably provided at the end of the travel.

However, such an apparatus which is particularly reliable with respect to its principle of operation may still be rendered defective. Thus, one of the possible incidents requiring the immediate dropping of the absorbing element may simultaneously consist of the stoppage of the cooling of the core due to a blockage of the liquid metal circulating pumps, and in the absence of a command from the electromagnet the absorbing element will be released. Although the possibility of these two faults occurring on the apparatus at the same time is almost non-existent, it is still necessary to provide a safety apparatus which ensures a completely automatic dropping of the absorbing element and which in all cases comes into operation as soon as there is an abnormal rise in the temperature of the liquid metal.

BRIEF SUMMARY OF THE INVENTION

The present invention relates to a safety apparatus which meets this requirement.

According to the invention, this apparatus relates more particularly to an absorbing element comprising a support head joined by a disconnectable linkage constituted by the armature of an electromagnet to the end of an axially movable vertical operating rod, said linkage being such that in the case of a disconnection the absorbing element slides by gravity in a passage bounded in an open container through the reactor core, wherein the operating rod is associated with a metal member having an expansion coefficient which is significantly higher than that of the armature of the electromagnet and in the case of an abnormal temperature rise it exerts a separating force between the head of the absorbing element and the operating rod.

Under these conditions the temperature rise of the liquid metal caused by the stoppage of cooling to the core for whatever reason this may be causes the metal member to exert a pressure on the head of the absorbing element and/or on the operating rod and causes their immediate separation, thus ensuring a reliable and automatic operation, whereby the disengagement temperature of the absorbing element can easily be regulated as a function of the initial position of said member.

According to a first embodiment of the invention, the metal member comprises a jacket or sleeve carried by the operating rod and surrounding with a clearance the end of said rod, whereby its edge is flush with the head of the absorbing element. According to another variant the metal member comprises a finger disposed axially in the rod and traversing the armature of the electromagnet

BRIEF DESCRIPTION OF THE DRAWINGS

Other features of a safety apparatus according to the invention can be gathered from the following description of several non-limitative embodiments of the invention and with reference to the attached drawings, wherein show.

DETAILED DESCRIPTION OF THE PREFERRED EMBODIMENTS

Figure 1:
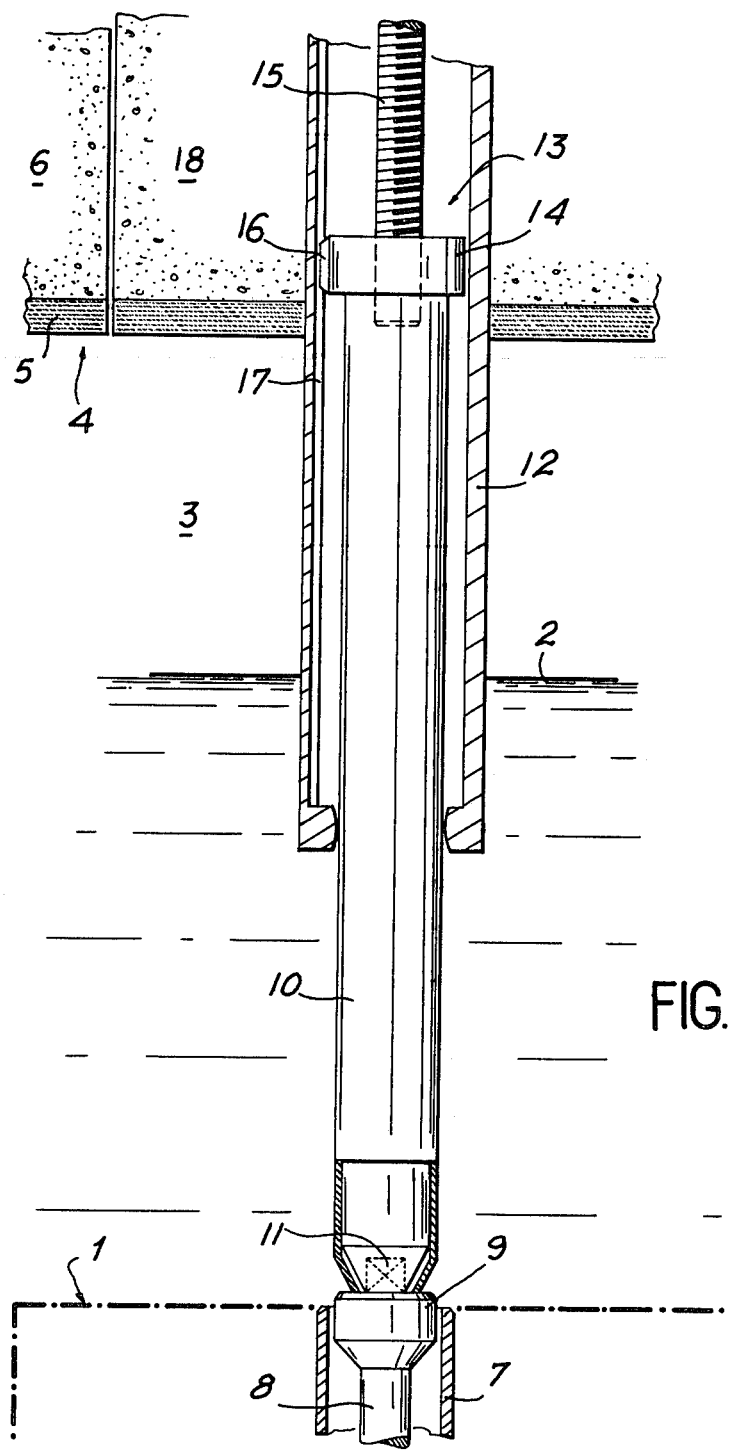
FIG. 1, a diagrammatic sectional view of the core of a fast neutron reactor with an axially movable operating rod for controlling the position of the absorbing element.

In FIG. 1 the reference numeral 1 diagrammatically designates the core of a nuclear reactor, more particularly of the fast neutron type. This core is immersed in an appropriate volume 2 of a liquid cooling metal which is generally sodium and contained within a not shown vessel. Above the sodium in the vessel is provided a neutral gas cushion 3, whilst the upper part of said vessel is sealed by a horizontal protective slab 4 comprising a lower metal base plate 5 and a sufficient thickness 6 of a protective material such as concrete.

The fissionable and fertile assemblies necessary for establishing and maintaining the nuclear reaction are distributed in known manner within core 1. These assemblies are not shown in the drawings for reasons of clarity. It is only possible to see the upper open end of a container 7 positioned among the other assemblies of the core and having the same geometrical shape as the latter and within which slides an absorbing element 8. The upper part of the latter is provided with a head 9 permitting the attachment of element 8 with the lower end of an axial control rod 10. The detailed construction of absorbing element 8 is preferably the same as that described and represented in the U.S. patent application Ser. No. 521, 900 filed on Nov. 7, 1974.

The connection between the axial operating rod 10 and head 9 of absorbing elements 8 is disconnectable and is provided by means of an electromagnet 11 in order to permit in the manner described in the above-mentioned patent a violent drop into container 7 by simply interrupting the power supply to the electromagnet. Independently of this safety operation the displacement of rod 10 outside container 7 is effective through the sliding of said rod within a guide tube 12, whereby the rod has at its upper end a control system 13 in this case constituted by a nut 14 cooperating with a threaded rod 15. Obviously it would be possible to use in this case any equivalent control system constituted for example by a rack and pinion mechanism.

Laterally nut 14 has a key 16 sliding in a groove 17 of guide tube 12 in order to transform the rotary movement of threaded rod 15 into an axial displacement movement for rod 10. The assembly constituted by guide rod 12 and rod 10 is carried by a plug member 18 which engages in an appropriate passage provided in the protective slab 4.

Figures 2, 3:
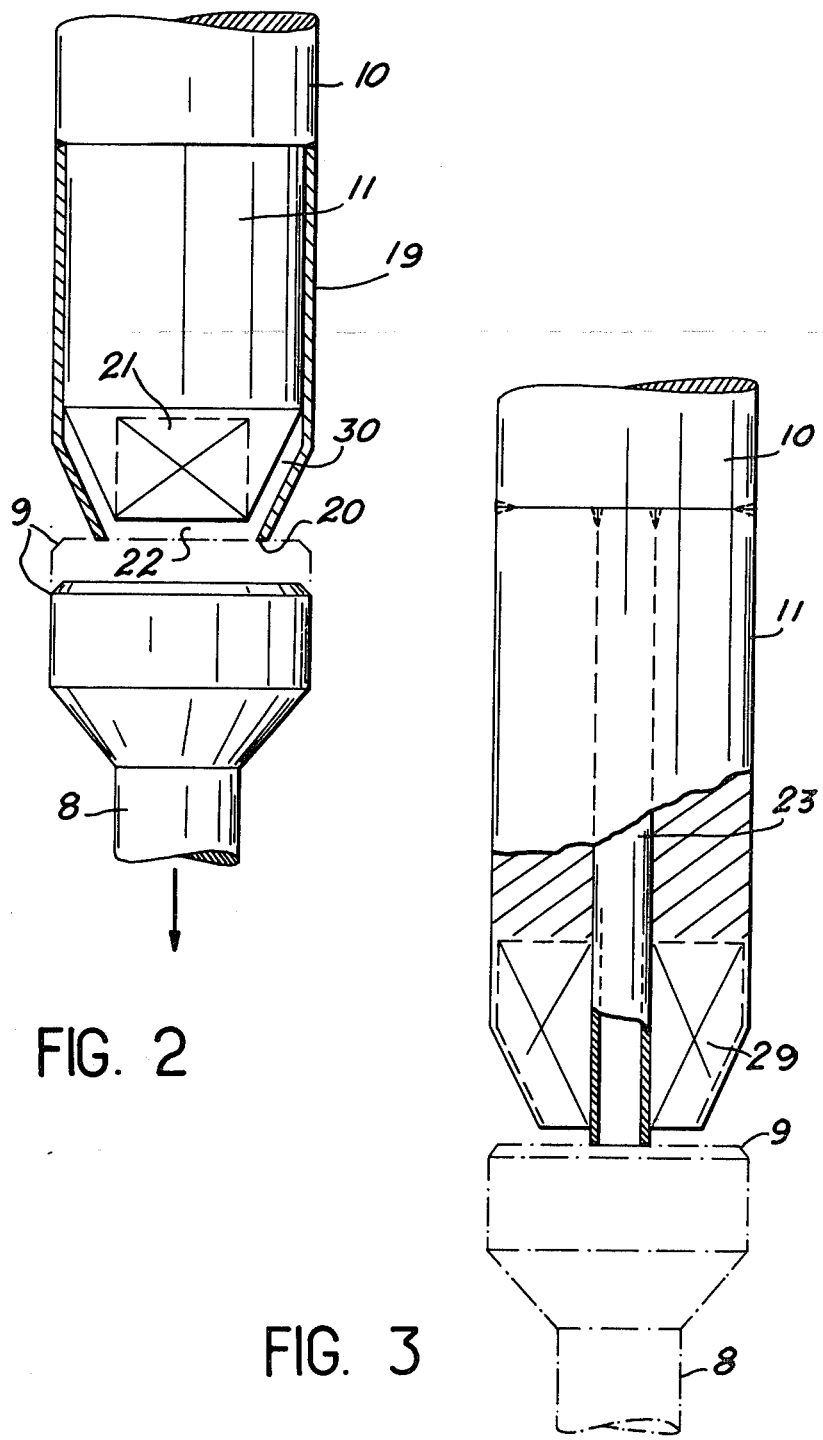
FIG. 2, a larger scale detail of the end of the operating rod and the head of the absorbing element illustrating the safety apparatus according to the invention in a first embodiment.
FIG. 3, a view identical to that of FIG. 2 illustrating another embodiment of the apparatus.

FIG. 2 illustrates on a larger scale the lower end of operating rod 10 provided with the electromagnet 11. According to the invention, the latter is surrounded, whilst leaving an appropriate clearance, by a coaxial jacket 19 made from a material (metal or alloy) having an expansion coefficient which is significantly higher than that of the core of the electromagnet. The lower end 20 of jacket 19 is flush with head 9 of element 8 in such a way that under normal operating conditions armature 21 of electromagnet 11 provides an air gap 22 which maintains element 8. Therefore any temperature rise in the core, for example, due to a blockage of the liquid metal circulating pumps leads to an increase in the longitudinal dimensions of jacket 19 so that end 20 thereof thrusts the head 9 of absorbing element 8, thereby bringing about the separation of its connection with armature 21 and the drop of said element into container 7. Obviously the disengagement temperature of element 8 can easily be regulated as a function of the initial position of jacket 19 and the magnitude of the gap 22 of the electromagnet.

In another embodiment illustrated in FIG. 3 the metal member carried by electromagnet 11 is in the form of an axial rod 23 traversing the armature 21 of the electromagnet and then again bears on head 9 of absorbing element 8 in such a way as to cause as hereinbefore as a result of a temperature rise the separation of the connection with the operating rod and the drop into the core. Finally in another not shown variant, it is also possible to fit the jacket or axial finger on the head of the actual absorbing element and not around or in the electromagnet in order to bring about in an identical manner the separation of said rod and said element. It should be noted that an appropriate clearance 30 (FIG. 2) is always provided between jacket 19 and electromagnet 11 in order to permit the corresponding retraction of the jacket during temperature reductions.

The ratio of the expansion coefficients between the material constituting the electromagnet preferably made from ARMCO iron or very pure electrolytic iron and that of the axial finger or jacket mounted in the electromagnet and constituted by stainless steel is equal to or close to 2, these coefficients being of the order of 1 mm/m/100° C. for ARMCO iron and 2 mm/m/100° C. for stainless steel type "316L". Under these conditions a 500 mm long cylindrical jacket will have an elongation in excess of 5/10 mm compared with that of the electromagnet if the liquid metal temperature rises from 545° C., which is the normal operating temperature, to for example 645° C. which is very adequate for ensuring the disconnecton of the electromagnet and the absorbing element with a sufficiently small response time.

In this way a safety apparatus of very simple design is obtained which makes it possible to ensure a completely automatic and reliable operation in the case of a temperature rise caused by a flow deficiency around the core or for any other similar reason. It should be noted that this absence or limitation of the liquid material flow causes not only an expansion of the metal member associated with the support rod which bears on the head of the absorbing element, but also causes an increase in the apparent weight of the latter and a decrease in the lifting capacity of the electromagnet due to the decline in its magnetic charcateristics. These other factors are combined and act in the same sense to produce the separation of the operating rod and the absorbing element.

The invention is not limited to the embodiments described and represented hereinbefore and various modifications can be made thereto without passing beyond the scope of the invention.

What is claimed is:

1. A safety apparatus for a nuclear reactor comprising
   an absorbing element having a supporting head;
   an operating rod which is vertically movable and provided with a lower end;
   an upper open container adapted to permit a sliding displacement of said absorbing element under the effect of gravity;
   disconnectable link means between the supporting head and the lower end of said operating rod, and adapted to disconnect said operating rod from said absorbing element at a given temperature, said link means comprising
   an armature of an electromagnet fixed at the lower end of said operating rod and creating an attracting magnetic force, said armature having a first expansion coefficient; and,
   a metal elongated element, a first extremity of which is fixed to one of two elements consisting of the lower end of said operating rod and the head of said absorbing element, a second extremity of said element being adapted to contact said head, said elongated element having a second expansion coefficient, said elongated element having at a temperature lower than said given temperature a first length and at said given temperature a second length, said second length being such that the distance between said lower end and said head is sufficient to annul the effect of said attracting magnetic force on said head.

2. A safety apparatus for a nuclear reactor comprising an absorbing element having a supporting head;
an operating rod which is vertically movable and having a lower end;
an upper open container adapted to permit a sliding displacement of said absorbing element under the effect of gravity;
disconnectable link means between the supporting head and the lower end of said operating rod, adapted to disconnect said operating rod from said absorbing element at a given temperature, said link means comprising
an armature of an electromagnet fixed at the lower end of said operating rod and creating an attracting magnetic force, said armature having a first expansion coefficient and
a jacket carried by the operating head and surrounding with a clearance the end of said rod, whereby its edge is flush with the head of the absorbing element, said jacket having a second expansion coefficient said jacket having at a temperature lower than said given temperature a first length and at said given temperature a second length, said second length being such that the distance between said lower end and said head is sufficient to annul the effect of said attracting magnetic force on said head.

3. A safety apparatus for a nuclear reactor comprising
an absorbing element having a supporting head;
an operating rod which is vertically movable and provided with a lower end;
an upper open container adapted to permit a sliding displacement of said absorbing element under the effect of the gravity;
disconnectable link means between the supporting head and the lower end of said operating rod and adapted to disconnect said operating rod from said absorbing element at a given temperature, said link means comprising
an armature of an electromagnet fixed at the lower end of said operating rod and creating an attracting magnetic force, said armature having a first expansion coefficient; and
a finger which is disposed axially in the operating rod and traverses the armature of the electromagnet, said finger having a second expansion coefficient said finger having at a temperature lower than said given temperature a first length and at said given temperature a second length, said second length being such that the distance between said lower end and said head is sufficient to annul the effect of said attracting magnetic force on said head.

* * * * *